Patented July 27, 1926.

1,593,977

UNITED STATES PATENT OFFICE.

HENRY A. KOHMAN AND ROY IRVIN, OF PITTSBURGH, PENNSYLVANIA, ASSIGNORS, BY MESNE ASSIGNMENTS, TO THE FLEISCHMANN COMPANY, OF NEW YORK, N. Y.

MANUFACTURE OF LEAVENED BREAD.

No Drawing. Application filed December 13, 1919. Serial No. 344,514.

In Letters Patent of the United States, No. 1,274,898 issued August 6, 1918, for improvements in the manufacture of leavened bread, there is described and claimed admixing with the flour, yeast and other ingredients of the dough batch, the diastatic and proteolytic enzymes produced by the action of an enzyme-producing fungus upon carbohydrate and protein substances and then fermenting the batch.

The preferred carbohydrate and protein substance referred to in said patent as the medium upon which the enzyme-producing fungus (preferably *Aspergillus oryzæ*) was to be grown was coarse hominy or maize. However, maize is not rich in nitrogen, and, for that reason, its capacity to produce a substance that is high in diastatic properties is correspondingly limited.

We have ascertained that by adding to the coarse hominy or maize certain materials which are rich in nitrogen, the sugar-forming powers are greatly increased. For instance, if we add skim milk powder or wheat gluten, or other like substances rich in protein, the sugar-forming powers are considerably enhanced. These materials, however, are relatively expensive, and, in finding a cheaper source of nitrogen, we directed our attention to the use of the ammonium salts.

We ascertained, however, that the mere addition of ammonium salts to the water in which the coarse hominy or maize is cooked gives a medium in which the Aspergillus fungus does not grow to advantage; that is to say, the addition of more than a trace of the ammonium salt sets up a condition which results in very materially lessening the vigor of growth of the fungus with whose spores the cooked hominy is inoculated and robs the fungus of the desired function of binding the mass together as it should do during its growth.

We have discovered that this failure of the Aspergillus fungus to thrive in the presence of ammonium salts is due to the fact that when the fungus uses up some of the ammonium salts, there is left an acid residue prejudicial to the further growth of the fungus. For instance, if ammonium sulfate is added to the cooked hominy or like medium, the consumption by the micro-organism of a part of the nitrogenous nutriment thus provided, leaves a residue of sulfuric acid which, when of sufficient concentration, is prejudicial to the further thriving of the fungus.

The present invention is based upon the ascertainment of the fact that if the concentration of the acid residue is kept sufficiently low, the fungus will grow to advantage in the presence of relatively large quantities of ammonium sulfate. In other words, by adding to the mass a neutralizing agent (as, for instance, calcium carbonate) in sufficient quantity to neutralize the residue of sulfuric acid formed by the action of the fungus upon the ammonium sulfate, we found that successful growths were obtained although relatively large quantities of the ammonium sulfate were employed. For instance, in a batch of 500 parts of water and 666 parts of hominy, we were able to add from 20 to 30 parts of ammonium sulfate, together with a corresponding amount of calcium carbonate, and nevertheless obtain the usual thriving growth.

A typical method of carrying the invention into practice would be, for instance, as follows:

Take 500 parts, by weight of water and dissolve in it 20 parts by weight of ammonium sulfate. Then add 666 parts by weight of coarse hominy and cook until the water is absorbed, which usually takes about two hours. The mass is then cooled to a temperature of about 35° C. and 5 parts by weight of the inoculating material (Aspergillus) and 25 parts by weight of calcium carbonate are added. The batch is then placed in a warm moist room for from 18 to 24 hours until the growth of the fungus has bound the mass of hominy together. The product thus obtained is then dried at a temperature not high enough to destroy the enzymes and is then ground up into a meal-like product, when it is ready for use in the manufacture of leavened bread.

The seeding stock employed for the inoculation of the cooked hominy is obtained, in the preferred practice of the invention, in the manner described in U. S. Patent No. 1,274,898 hereinbefore referred to, that is, to say, by cultivating the enzyme-producing fungus,—for instance, the *Aspergillus oryzæ*,—upon a suitable medium, as herein fully set forth. So also, as described in said patent, there may be substituted for the hominy or Indian corn maize, other materials containing starchy and protein constituents susceptible to the same treatment by the Aspergillus or other enzyme-producing fungus.

We have found that it is not advisable to add the calcium carbonate to the water with the ammonium sulfate before cooking the hominy, because, in such procedure, much of the nitrogen would be driven off as free ammonia, whereas, if the calcium carbonate is added after cooking, the loss of ammonia is slight. In some instances, it will be desirable to add a small quantity of acid to the water in which the hominy is cooked,—particularly if the calcium carbonate contains any free calcium hydroxide; this will tend to prevent the loss of ammonia during the growing process. It will be understood that the main advantage of using an ammonium salt in growing the fungus is, as hereinbefore indicated, that it greatly increases the sugar-forming powers of the finished product. For instance, if no ammonium salts were added to the cooked hominy, the Lintner value obtained would range from 3° to 6°; whereas if ammonium sulfate, together with calcium carbonate, is employed in the manner described, an increase in the Lintner value is observed with increasing quantities of the salts, and, when about 20 parts by weight of ammonium sulfate is used in 500 parts by weight of the water in which the hominy is cooked, as in the typical example hereinbefore given, the Lintner value is increased to a range of from 25° to 30° Lintner.

In the above mentioned patent to Henry A. Kohman the *Aspergillus oryzæ* is specifically mentioned as the preferred fungus for use in the process to which the patent is directed, and it is for the growth of this fungus that the process of this patent is specifically employed. It is to be understood, however, that the invention is not limited to the use of *Aspergillus oryzæ* in producing the product to be employed in the bread-making process, but that various other fungi which are well known to have like properties may be employed instead. Other mold fungi belonging to the genus Aspergillus may be employed, as may also fungi belonging to the genus Mucor and genus Pencillium which are known to possess the proteolytic and diastatics properties of the *Aspergillus oryzæ*.

Having thus described our invention, what we claim is:—

1. The method of producing a substance useful in the manufacture of leavened bread, which comprises cooking hominy in a water solution of ammonium sulfate until the solution is absorbed by the hominy, adding thereto an inoculating fungus of the genus Aspergillus, together with calcium carbonate, and growing the fungus until the mass of hominy has been bound together, then drying the product at a temperature not high enough to destroy the enzymes, and grinding it up into a meal-like product; substantially as described.

2. The method of producing a substance useful in the maunfacture of leavened bread, which comprises cooking hominy in a water solution of ammonium sulfate until the solution is absorbed by the hominy, adding thereto *Aspergillus oryzæ*, together with calcium carbonate, and growing the fungus until the mass of hominy has been bound together, then drying the product at a temperature not high enough to destroy the enzymes, and grinding it up into a meal-like product; substantially as described.

In testimony whereof we hereunto affix our signatures.

HENRY A. KOHMAN.
ROY IRVIN.